Dec. 17, 1935.                R. T. KENT                2,024,691
          BUFFING WHEEL AND METHOD OF MAKING THE SAME
                  Filed July 13, 1934          3 Sheets-Sheet 1

INVENTOR
ROBERT T. KENT
BY
           ATTORNEY

Dec. 17, 1935.  R. T. KENT  2,024,691
BUFFING WHEEL AND METHOD OF MAKING THE SAME
Filed July 13, 1934  3 Sheets-Sheet 2

INVENTOR
ROBERT T. KENT
ATTORNEY

Dec. 17, 1935.   R. T. KENT   2,024,691
BUFFING WHEEL AND METHOD OF MAKING THE SAME
Filed July 13, 1934   3 Sheets-Sheet 3
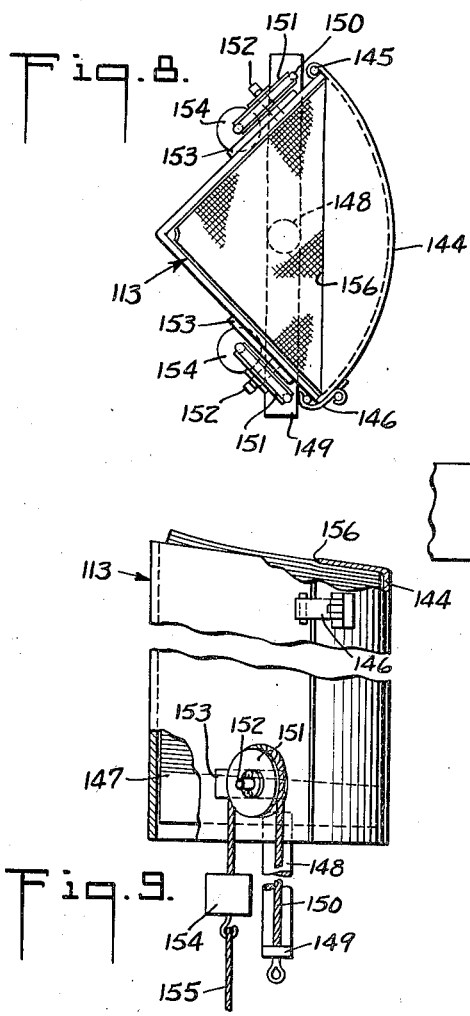
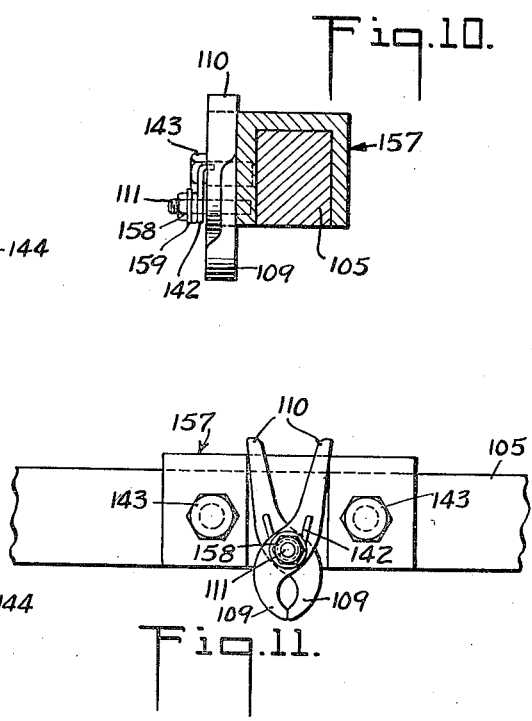
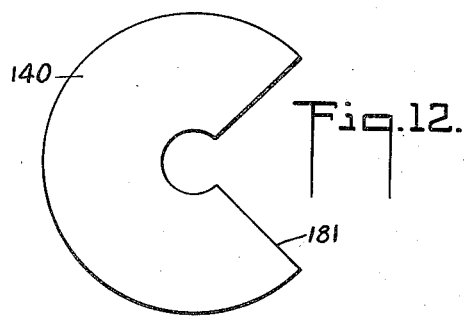
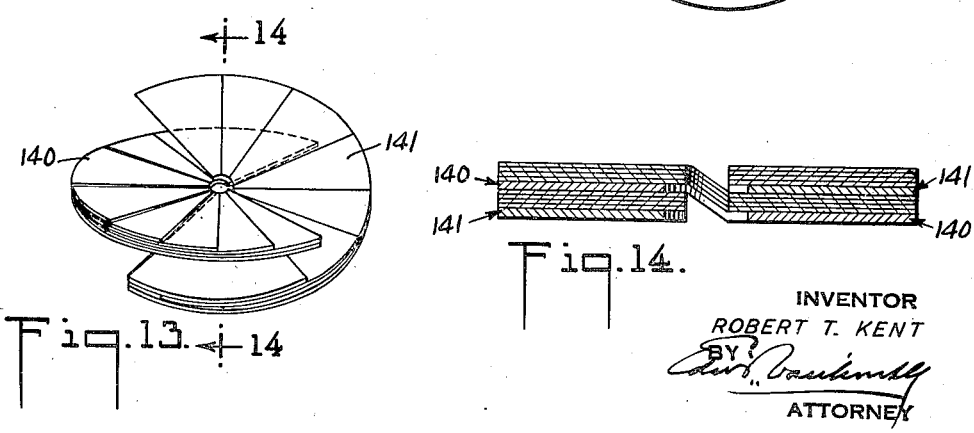
INVENTOR
ROBERT T. KENT
BY
ATTORNEY Patented Dec. 17, 1935

2,024,691

UNITED STATES PATENT OFFICE 2,024,691

BUFFING WHEEL AND METHOD OF MAKING THE SAME

Robert Thurston Kent, Verona, N. J.

Application July 13, 1934, Serial No. 734,925

7 Claims. (Cl. 51—193)

My invention relates to buffing wheels and more particularly to that type of wheel known to the trade as rag wheels, wherein the buffing wheel is made up of a plurality of pieces of fabric, and has for its object to produce a wheel that will not only give a better finish upon the work to be buffed entirely free from scratching and buff marks but will have inherent characteristics that will prevent the over-heating of the wheel while in operation.

A further object of this invention is to provide a method of manufacture of the wheel that will permit the improved wheel to be manufactured at no greater cost than ordinary buffing wheels now on the market.

The ordinary buffing wheels consist of layers of fabric laid one upon the other, the plane of each layer being perpendicular to the axis of the wheel. When the wheel is rotated at high speed the individual layers of fabric, being parallel to each other, leave parallel marks or scratches on the finished surface of the work, the action being analogous to that of a series of circular saws placed parallel to each other on the same spindle. Furthermore, under severe usage this form of buff generates a considerable amount of heat, due to its friction against the work. Its construction is such that little or no air can be circulated through the buff to dissipate this heat, and in consequence the fabric may char or burst into flame.

In my invention the fabric is so arranged that each layer lies in a helical plane and therefore is at an angle to the axis. The rotation of the buffing wheel thus causes the layers of fabric to move diagonally across the surface of the work, and to cut with a shearing, instead of a sawing, action. Any marks left on the surface of the work by an individual layer of fabric are eliminated by the following layer, and a much higher degree of finish is thus possible. The arrangement of the layers of fabric also is such that an air channel is formed between each layer. These channels extend completely across the buffing wheel. The forward traveling edge of each layer of fabric acts as a fan blade that forces air through the channel. This air carries off the heat generated by the friction of the buffing wheel against the work, and keeps the wheel cool. The life of the wheel is thus prolonged. Since my buffing wheel may be forced against the work with a much greater amount of pressure than the ordinary type of buff without generating a dangerous quantity of heat, the amount of work that it will perform in a given time is greater.

The foregoing and other features of my invention will now be described in connection with the accompanying drawings forming part of this specification in which I represent my buffing wheel and a manner of making the same in a preferred form after which I shall point out in the claims those features which I believe to be new and of my own invention.

In the drawings:—

Figure 3:
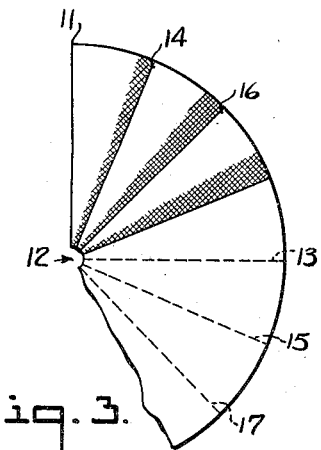

Figure 3 diagrammatically shows the assembly of several sectors.

Figure 4:
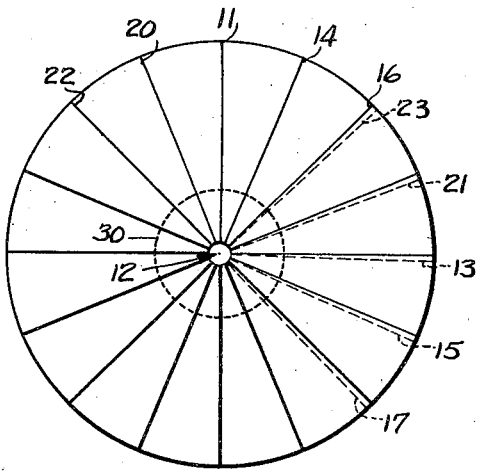

Figure 4 is a side view of an assembled buffing wheel.

Figure 5:
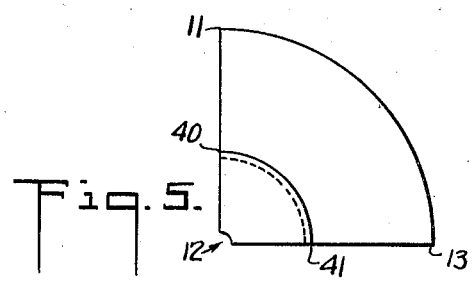

Figure 5 is a modification of sector which I may employ.

Figure 6:
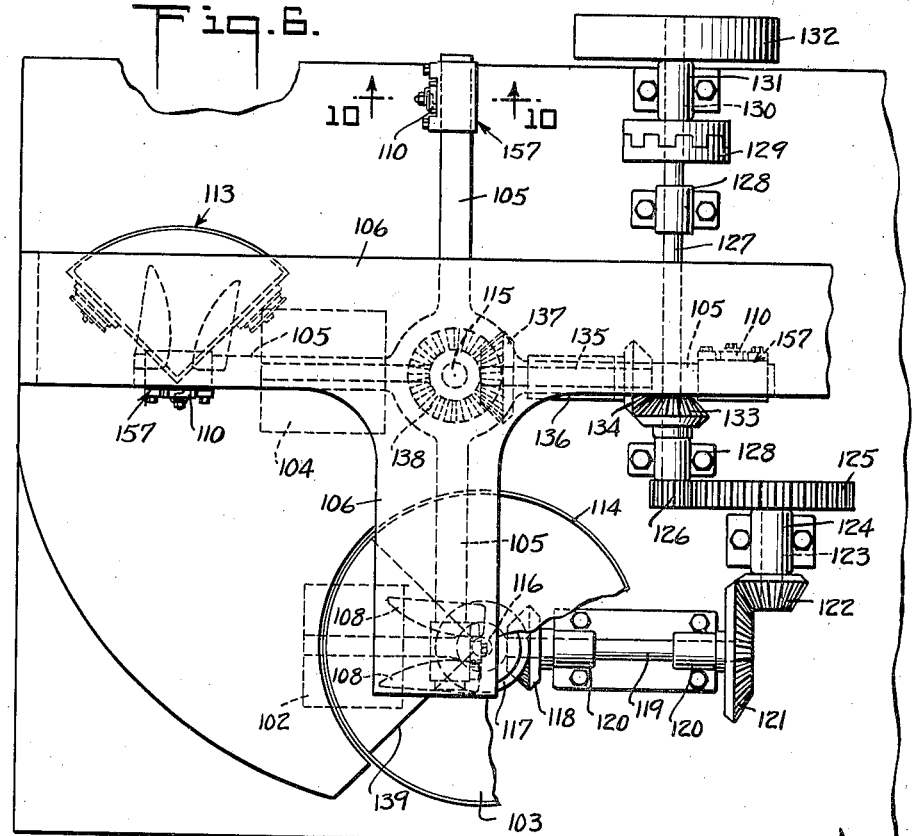

Figure 6 is a plan view of my improved machine.

Figure 7:
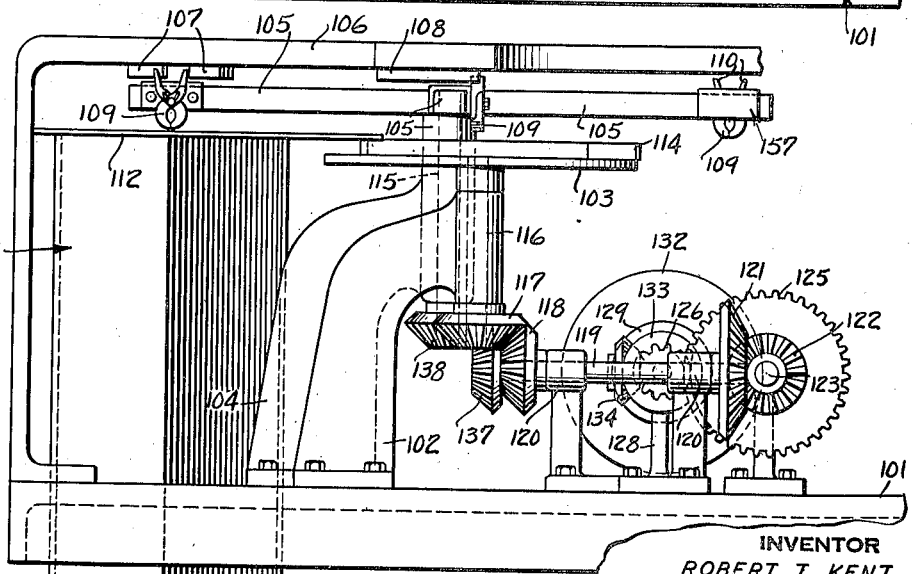

Figure 7 is an elevation thereof.

Figure 8 is an enlarged detail of my magazine in which the sectors are stacked prior to assembling in a wheel.

Figure 9 is an elevation thereof.

Figure 10 is a section along the line 10—10 Figure 6, enlarged to show details of gripping device.

Figure 11 is a side view of the gripping jaws at right angles to that shown in Figure 10.

Figure 12 is a detail of an assembly plate which I may employ.

Figures 13 and 14 show details of assembly of buff.

Figure 2:
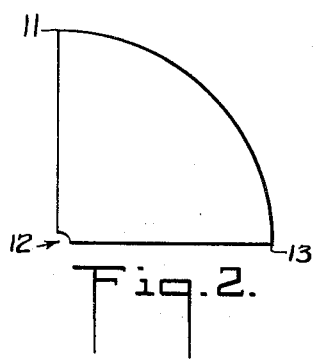
Figure 2 shows the shape of a sector which I may employ.

My improved buffing wheel comprises a series of layers of fabric, cut in the form of sectors of a circle as shown more specifically in Figure 2, the several sectors being laid one upon the other in such a manner as to form a complete circle, the consecutive sectors so over-lapping that the corresponding radial edges form approximately equal angles with each other.

The sector in Figure 2 is shown with a center angle, 11, 12, 13 of 90 degrees. It is perfectly obvious that this center angle can be made either greater or less than 90 degrees as may be desired and I do not desire to limit myself to this specific sector shape.

In constructing the buffing wheel, the several sectors are laid upon each other, approximately equally spaced around the circumference of a circle as shown in Figure 4. In Figure 3 the sector 11, 12, 13 is first placed in position, and sector 14, 12, 15 is laid upon it as shown. The centers 12 of both sectors coincide, and the edges 11, 12 and 14, 12 form the angle 11, 12, 14. Sector 16, 12, 17 is then laid upon sector 14, 12, 15, the centers 12 coinciding and the edges 14, 12 and 16, 12 forming the angle 14, 12, 16 which is made approximately equal to angle 11, 12, 14. In like manner, sectors are laid one upon the other until the circle is complete. The sectors added at the latter end of the operation are placed beneath those first set in position as shown in Figure 4. In Figure 4 sectors 11, 12, 13; 14, 12, 15; 16, 12, 17; etc., are first placed in position as heretofore described. The final sector 20, 12, 21 is placed with its edge 20, 12 underneath sector 11, 12, 13, the next preceding sector 22, 12, 21 is placed with its edge 22, 12 under sector 14, 12, 15 etc. The completely assembled sectors may be fastened by one or more rows of sewing 30 around the common center 12. It is obvious that any other means may be used to fasten the sectors together, and I may use wire staples penetrating from one side of the buffing wheel to the other or an adhesive such as glue, applied to each sector and extending as far from the common center 12 as may be desirable or necessary. It is also obvious that the buffing wheel may be reinforced by additional sewing either in concentric rows about the center or in a spiral extending outward from the center, or in radial or straight or curved lines either parallel or intersecting.

In the construction heretofore described, the several sectors lie immediately adjacent to one another. Such a construction forms the hardest and densest type of buffing wheel. To vary the density, or to obtain a softer wheel, the sectors may be separated from each other by additional sectors of fabric, cardboard, or other material, which sectors are of shorter radius than the sectors forming the main body of the buffing wheel. These so-called packing sectors 40, 12, 14, as shown in Figure 5, may be fastened to the principal sectors by any convenient means, the center of the sectors so fastened together being coincident. Each principal sector, together with its attached packing sector, is assembled with other similar sectors to form a complete buffing wheel in the manner heretofore described.

Figure 1:
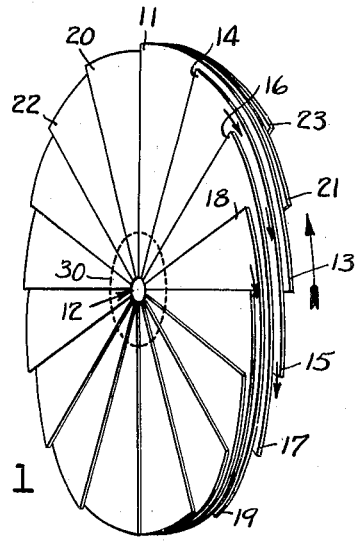
Figure 1 is a perspective view of my improved buffing wheel with the spacing between the sectors exaggerated for the purpose of showing more clearly their relation to each other.

It is apparent in Figure 1 that between each pair of adjacent sectors a clear passageway, as 12, 11, 13, 15, 14, extends from one side of the buffing wheel to the opposite side. In the rotation of the buffing wheel, each forward traveling edge, as 12, 14, diverts air into the passageway between the sector of which it is a part and the next preceding sector. The rapid rotation of the buffing wheel causes this air to flow through the passageway, through and across the buffing wheel, and to be discharged as at 15, 12 at the opposite side from which it entered. This continuous flow of air through the buffing wheel dissipates the heat generated by the action of the buffing wheel on the work, and enables the buff to work at a lower temperature than it would if no means of dissipating heat were provided.

It is obvious that by changing the angle between the corresponding radial edges of the sectors comprising the buffing wheel the thickness or width of face of the wheel may be varied. An increase in the angle will decrease the thickness of wheel, since a fewer number of sectors will be required to form the complete circle. Conversely, a decrease in the angle will increase the thickness of the wheel. It is also obvious that an increase in the number of sectors comprising a buffing wheel will increase the angularity of the circumferential edge of the sector with respect to the axis of the buffing wheel. The greater the angularity of the circumferential edge of the sector the more pronounced will be the diagonal cutting action of the buffing wheel, and the higher the degree of finish obtained on the work.

In assembling these buffs I employ a machine shown in detail in Figures 6 and 7. This machine consists of a table, 101, on which is mounted a supporting bracket, 102, carrying a revolving table 103. A second supporting bracket, 104, carries a set of four arms 105, which are rotated in a horizontal plane by the vertical shaft, 115. A support, 106, carries on its lower surface a pair of fixed cams, 107, whose purpose is to operate the pick-up jaws, 109, mounted on arms 105, to cause them to lift up a single sector of fabric from the fabric magazine, 113, and transfer it to the revolving table 103. A pair of release cams, 108, open the pick-up jaws, permitting them to deposit the sector of fabric upon the revolving table 103. A guide plate, 112, serves to keep the sector in a horizontal position while it is being transferred from the sector magazine 113 to the revolving table, 103. A guard rail, 114, surrounds approximately one-half the circumference of the revolving table, 103, and serves to keep the sectors in position after they have been deposited thereon.

The revolving table, 103 is carried upon and rotated by a vertical shaft, 116, which passes through a bearing on the supporting bracket, 102. On the lower end of this vertical shaft a miter gear, 117, meshes with a similar gear, 118, carried at the extremity of a horizontal shaft, 119, which runs in bearings, 120, carried on the table, 101. Upon the opposite end of shaft, 119, is a bevel gear, 121, which meshes with a bevel pinion, 122, carried on a short horizontal shaft, 123, which is supported by bearing 124. Upon the opposite end of this shaft, 123, is a spur gear 125, which meshes with a spur pinion, 126, carried on the end of the main drive shaft 127. This main drive shaft is carried in bearings 128, and has mounted on the opposite end from spur pinion, 126, one-half of a clutch, 129. The opposite half of the clutch is carried by a shaft, 130, rotating in bearing 131, and carries upon its outer end drive pulley, 132. Also carried upon main drive shaft, 127, is a miter gear, 133, which meshes with a corresponding gear, 134, mounted upon one end of horizontal shaft, 135, carried in bearing, 136. Upon the opposite end of shaft, 135, is a miter gear, 137, meshing with a corresponding miter gear, 138, carried on the lower extremity of the rotating arm shaft, 115.

Spur gears, 125 and 126, are change gears which may be replaced with gears of different ratio to cause the relative speed of rotation of the rotating arms, 105, and the revolving table, 103, to be varied as desired.

Figures 8 and 9 are enlarged details of the sector magazine which is described more fully hereinafter. Figures 10 and 11 are details of the pick-up jaws, 109, and of the fixture upon which they are mounted, both being described more fully hereinafter.

Referring more particularly to Figures 8 and 9:—At the back of the magazine is a hinged sheet metal door, 144, supported by hinges, 145, and held closed with a latch, 146. The bottom of the magazine is closed by a block, 147, which is so proportioned as to vertically slide freely in the magazine when door 144 is closed. The upper surface of this block is formed at an angle of approximately 10° from the horizontal. The upper edges of the sides of the sector magazine, 113, are cut back from the vertex at the same angle so that the top of the block, 147, and the tops of the sides of the sector magazine are parallel and to provide clearance for the pick-up jaws in approaching the pick-up position. At the bottom of the block is attached a rod, 148, whose length is slightly greater than the depth of the sector magazine. At the bottom of this rod, a cross piece, 149, is attached of sufficient length to project beyond the sector magazine, 113. Through two holes in the extremities of this cross piece two cords or cables, 150, are threaded. These cords are led upwards and over pulleys, 151, which are free to rotate on spindles, 152, said spindles being carried on brackets, 153, attached to the side of the sector magazine. A weight, 154, is attached to the free end of the cord, 150, in such position that when the block, 147, is in its lowest position in the sector magazine the weight, 154, will be just below the edge of the magazine. From the lower face of the weight, 154, is suspended a cord whose weight is approximately equal to the weight of the sectors in the magazine. With the weight, 154, in its uppermost position, the length of the cord should be such that its lower extremity just touches the floor or other permanently placed support. Weight 154, should be so proportioned to give the necessary upward pressure to slide block, 147, and its superposed load of sectors upwards in the magazine. The upper end of the door, 144, is turned to form a lip, 156, to prevent the sectors being pushed out of the magazine.

The operation of the sector magazine is as follows. The block, 147, is placed in its lowest position and enough sectors of fabric are placed between the sides, 113, of the magazine to completely fill the magazine. The door, 144, is then closed and latched, the upward pressure exerted by the weight, 154, causes the block 147, to move upwards forcing the outer edge of the sectors against the lip 156. The pressure exerted upwards can be regulated by increasing or decreasing the weight 154, and should be sufficient to slide the sectors upwards in the magazine but not great enough to pinch them so firmly against lip 156, that they cannot be withdrawn freely by means of the pick-up jaws on rotating arm 105. As each sector is withdrawn from the magazine the upward pressure exerted by weight 154, moves the sectors in the magazine upwards and brings the next succeeding sector into position to be picked up and withdrawn by the pick-up jaws, 109, on rotating arm 103. As weight 154 descends, the cord 155, depending on it piles up on the floor, thus shortening the length of cord depending from weight 154. This decreases the upward pressure exerted by weight 154 by an amount equal to the weight of sectors removed and consequently maintains the pressure of the sectors against lip 156, practically constant.

Figures 10 and 11 are respectively a front elevation and end elevation of the pick-up jaws and the fixture carrying them. A sleeve, 157, open at both ends and on one side is fitted over rotating arm 105. Cap screws, 143, serve to lock it in any position desired on the bar. The pick-up jaws, 109, are pivoted upon a pin, 111, which is fitted into and riveted in position in sleeve 157. A heavy coiled spring 142 surrounds pin, 111, its ends being bent at right angles and inserted in holes drilled in the pick-up jaw levers 110. The purpose of this spring is, after the pick-up jaws have been open by the action of the cams, 107 and 108, in Figures 6 and 7, to close the jaws after the pick-up levers have moved out of contact with said cam. The jaws 109 and the spring are held in place by a nut 158, screwed on the end of pin 111, a washer 159, being interposed between the nut and the spring.

The operation of the machine is as follows. The sector magazine, 113 being filled with sectors of fabric, the rotating arms 105 are caused to rotate about shaft 115 by the engagement of the two halves of clutch 129. As an arm 105 rotates underneath the cam support 106, the levers 110 on the extremities of the pick-up jaws 109 are engaged by the cams 107. As the arm 105 continues to rotate the pressure of the cams 107 upon the extremities of the pick-up levers 110 cause these levers to approach each other, thus causing the pick-up jaws 109 to open. The cams 107 terminate at a point such that they will release the extremities of the pick-up levers 110 when the pick-up jaws 109 are directly over the vertex of the sector magazine 113. The pick-up jaws 109, in closing, grasp between them the upper-most sector in the sector magazine 113.

As the arm 105 continues to rotate forward it draws the sector grasped by the pick-up jaws 109 over the edges of the sector magazine 113 and on to the conveying plate 112. Continuing its forward movement, rotating arm 105 draws the sector into position as shown at 139 over the upper surface of revolving table 103.

As rotating arm 105 moves into this position, the extremities of the pick-up jaw levers 110 come into engagement with release cams 108. These cams are so positioned that when the vertex of the sector is immediately above the center of revolving table 103 they cause pick-up jaws 109 to open and release the sector, which then drops into the position as shown at 139 on revolving table 103.

The ratio of change gears, 125 and 126, has been so chosen that during the movement of arm 105 from its initial position over the sector magazine, 113, to its final position over the center of revolving table 103, revolving table 103 has been rotated the necessary number of degrees to give the desired amount of overlap of the consecutive sectors. As each succeeding arm 105, moves into position and deposits the sector it is carrying, table 103 has advanced a sufficient distance to cause the consecutive sectors to overlap each other as shown in Figure 3.

The machine is permitted to operate as heretofore described until revolving table 103 has completed one-half of a revolution. The assembled sectors are then removed and the operation is repeated. The two half buffing wheels thus assembled are then placed together by hand to form a completed wheel and the sectors comprising the wheel are fastened together by one or more rows of sewing or by any other convenient means as heretofore described. In the placing together of the two half wheels, it is necessary that the leading edge of each half wheel be placed over the trailing edge of the other half wheel before the several sectors are fastened together. A convenient means of placing the half wheels together is shown in Figures 13 and 14.

Instead of depositing the sectors directly upon revolving table 103, they are deposited upon a circular plate 140, Figure 12, which plate is first laid upon revolving table 103. This plate may be of metal, fiber, or any other convenient material. It has a hole cut in the center and a sector removed from the plate. The dimensions of this sector are such that the circumference of the remainder of the plate will be equal to one half of a circle plus the number of degrees in one of the sectors of which the buffing wheel is composed. The position of the plate, Figure 12, on revolving table 103, is such that one edge 181 of the opening in the plate corresponds with the edge of the first sector deposited to form one half of a buffing wheel, that is, one edge of the plate, Figure 12, will correspond to the edge of the sector 139 in Figure 6. After revolving table 103 has completed one half revolution it will be completely covered with sectors of fabric arranged in their proper relation to one another. The plate together with its assembled sectors is removed from the machine and assembled with a similar assembly to form a complete wheel as shown in Figure 13.

In Figure 13, 140 and 141 are respectively two plates with sectors of fabric assembled thereon as heretofore described. The plates with their assembled sectors are brought together so that their diameters coincide and the cut-away portion of each plate lies in diagonally opposite quadrants of the completed circle. The plates are first brought into this relationship with the planes of their upper surfaces at an angle to each other as shown in Figure 13. They are then rotated about a common diameter until they lie in the same plane as shown in Figure 14. While in this position one or more rows of sewing may be placed through the sectors at or near the circumference of the hole formed at the center of the pair of plates. The plates may then be withdrawn from between the layers of sectors and the buffing wheel is complete, or it may receive additional sewing, as heretofore described, if such additional sewing may be necessary or desirable.

I wish it distinctly understood that my buffing wheel herein described and illustrated and the method of and machine for making the same, described and illustrated, are in the form in which I desire to use and construct it and that changes or variations may be made as may be convenient or desirable without departing from the salient features of my invention and I therefore intend the following claims to cover such modifications as naturally fall within the lines of invention.

I claim:—

1. A buffing wheel composed of sectors of fabric, each sector consisting of two or more layers of fabric cut in the form of a sector, the radii of some of the sectors being shorter than the radii of the other sectors, the several layers of fabric being fastened together to form a single sector, the sectors thus formed assembled about a common center and extending from one radial side of the wheel to the other radial side; so that each sector passes through the wheel from one side to the other, the said built up sectors being fastened together by any convenient fastening.

2. A buffing wheel composed of sectors of fabric, each sector consisting of two or more layers of fabric cut in the form of a sector, the radii of some of the sectors being shorter than the radii of the other sectors, the several layers of fabric being fastened together to form a single built up sector, the sectors thus formed overlapping each other to form a complete circle, each built up sector extending without fold from one radial side of the wheel to the other, the sectors being fastened together with rows of sewing.

3. A method of constructing buffing wheels by consecutively assembling a plurality of sectors of fabric, the vertex of the sectors coinciding with the axis of the wheel, rotating the sectors about an axis corresponding with the vertex of the assembled sectors after the deposition of each sector a sufficient number of degrees to give each sector a predetermined overlap on the next preceding sector until the assembled sectors have been rotated through half a circle to form half of a buffing wheel and combining the half buffing wheel so formed with a similar half buffing wheel in such manner that the leading edge of each half wheel is above and covering the trailing edge of the other half wheel.

4. A buffing wheel composed of sectors of fabric assembled about a common center, each sector extending without fold from one radial side of the wheel to the other producing uniform thickness of the wheel throughout.

5. A buffing wheel comprising a plurality of sectors of circles of suitable fabric, the diameter of said circles being equal to the diameter of the wheel, said sectors assembled without fold in a single complete circle around the center of the wheel, each sector overlapping the one preceding it, the final sectors in the circle being laid underneath the first sectors whereby a clear passage from one radial side of the wheel to the other is formed, between each pair of adjacent sectors.

6. The device of claim 5 in which each ply of fabric in the wheel is at an angle to the plane perpendicular to the axis of the wheel.

7. A buffing wheel comprising a plurality of fabric sections assembled about a common center and extending without folding from one radial side of the wheel to the other radial side, said sections being fastened together adjacent the central portion so that upon rotation in either direction air channels are formed between the sections.

ROBERT THURSTON KENT.